(12) United States Patent
Sertkaya et al.

(10) Patent No.: US 10,464,514 B2
(45) Date of Patent: Nov. 5, 2019

(54) IMPACT ENERGY ABSORBER MEMBER FOR A VEHICLE

(71) Applicant: Ford Global Technologies, LLC, Dearborn, MI (US)

(72) Inventors: Samet Sertkaya, Istanbul (TR); Mahmut Erdem Ucanlar, Kocaeli (TR); Tugrul Kara, Istanbul (TR); Ilke Kayin, Istanbul (TR); Atilla Aksu, Istanbul (TR)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/827,351

(22) Filed: Nov. 30, 2017

(65) Prior Publication Data
US 2018/0186319 A1    Jul. 5, 2018

(30) Foreign Application Priority Data

Dec. 30, 2016   (EP) ..................... 16207446

(51) Int. Cl.
| | |
|---|---|
| *B60R 19/52* | (2006.01) |
| *B60R 19/02* | (2006.01) |
| *B60R 19/24* | (2006.01) |
| *B60R 21/34* | (2011.01) |

(52) U.S. Cl.
CPC ............ *B60R 19/52* (2013.01); *B60R 19/023* (2013.01); *B60R 19/24* (2013.01); *B60R 2021/343* (2013.01)

(58) Field of Classification Search
CPC ....... B60R 19/52; B60R 19/00; B60R 19/023; B60R 19/24
USPC ..................................................... 296/187.09
See application file for complete search history.

(56) References Cited

U.S. PATENT DOCUMENTS

| | | | | |
|---|---|---|---|---|
| 8,056,946 | B2* | 11/2011 | Bernt ................... | B60K 11/085 |
| | | | | 293/102 |
| 8,646,552 | B2 | 2/2014 | Evans et al. | |
| 2009/0039674 | A1* | 2/2009 | Hassdenteufel ....... | B60K 11/04 |
| | | | | 296/180.1 |
| 2014/0159429 | A1* | 6/2014 | Chung ................. | B62D 25/085 |
| | | | | 296/193.09 |
| 2015/0129336 | A1 | 5/2015 | Schneider | |
| 2015/0274211 | A1* | 10/2015 | Riedl ................... | B62D 25/084 |
| | | | | 296/187.09 |

FOREIGN PATENT DOCUMENTS

| | | |
|---|---|---|
| DE | 102008004311 A1 | 7/2009 |
| DE | 102009031746 A1 | 1/2011 |
| EP | 1352810 A2 | 10/2003 |
| FR | 2927033 A1 | 8/2009 |
| FR | 2965226 A1 | 3/2012 |
| JP | 6231546 A | 2/1987 |

* cited by examiner

*Primary Examiner* — Joseph D. Pape
(74) *Attorney, Agent, or Firm* — Vichit Chea; Price Heneveld LLP

(57) ABSTRACT

An impact energy absorber member for a vehicle configured to protect a lower leg of a pedestrian, with integrated air guiding member for guiding air from a front bumper of the vehicle to a radiator of the vehicle, wherein the impact absorber member comprises at least one vertical flap, wherein the flap is reinforced by a rib that is fixed to the front bumper and/or to a bolster frame of the vehicle.

6 Claims, 4 Drawing Sheets

— 1 —

IMPACT ENERGY ABSORBER MEMBER FOR A VEHICLE

FIELD OF THE INVENTION

The present invention generally relates to an impact energy absorber member for a vehicle, and further relates to a front module with such an impact energy absorber and a vehicle with such a front module.

BACKGROUND OF THE INVENTION

Automotive vehicles generally have air guiding parts behind the grilles of the front bumper of the vehicle for better engine cooling and aerodynamic performance. Vehicles also may have a pedestrian protection lower leg impact energy absorber in front of a bumper beam which is typically behind the front fascia and grilles. Cost and assembly issues generally emerge with current designs while maintaining pedestrian protection and low speed damageability safety targets.

FR 2 965 226 A1 discloses a device with an upper reinforcement, a lower reinforcement and two jambs connecting the upper reinforcement and the lower reinforcement so as to define a frame. The upper reinforcement and the lower reinforcement are provided with shock absorbers, where one of the shock absorbers is laid at ends of the upper reinforcement. Another shock absorber extends through the lower reinforcement. Deflectors are arranged partly around the frame.

DE 10 2008 004 311 A1 discloses a device with an air guiding element mechanically adjusted between a rest position and an operating position around a horizontal vehicle transverse axis. The element is adjusted by a dynamic pressure flap depending on the dynamic pressure acting at the flap. The flap is rotatably supported around a horizontal rotation axis. The flap is partially integrated in a lower body region of a bumper unit and/or a body-sided cover, and in between the bumper unit and an engine compartment cover, where the cover is arranged below the bumper unit.

JP 6231546 A discloses an air-spoiler which is fixed to the lower wall of a bumper fascia, and which is incorporated at its upper rear end integrally with an air guide projected rearward and made to be flush with the lower surface of an outside air introduction port. During running of a vehicle, the outside air entering into the outside air introduction port is rectified by the air guide so that air flows toward a radiator being stably guided.

It would be desirable to provide for an impact energy absorber assembly with reduced assembly process timing, costs, and weight.

SUMMARY OF THE INVENTION

According to one aspect of the present invention, an impact energy absorber member for a vehicle is provided. The impact energy absorber member for a vehicle is configured to protect a lower leg of a pedestrian, with one or more integrated air guiding members for guiding air from a front bumper of the vehicle to a radiator of the vehicle. The impact absorber member comprises at least one vertical flap that is reinforced by a rib that is fixed at least one of to the front bumper and a bolster frame of the vehicle.

According to another aspect of the present invention, an impact energy absorber member for a vehicle is provided. The impact energy absorber member for a vehicle includes at least one air guiding member for guiding air from a front bumper to a radiator of the vehicle and comprising at least one vertical flap, and a rib reinforcing the vertical flap and fixed to a component of a front module of the vehicle.

According to a further aspect of the present invention, a front module for a vehicle is provided. The front module for a vehicle includes a front bumper, a radiator, an air guiding member for guiding air from the front bumper to a radiator of the vehicle and comprising at least one vertical flap, and a rib reinforcing the vertical flap and fixed to a component of the impact energy absorber material.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
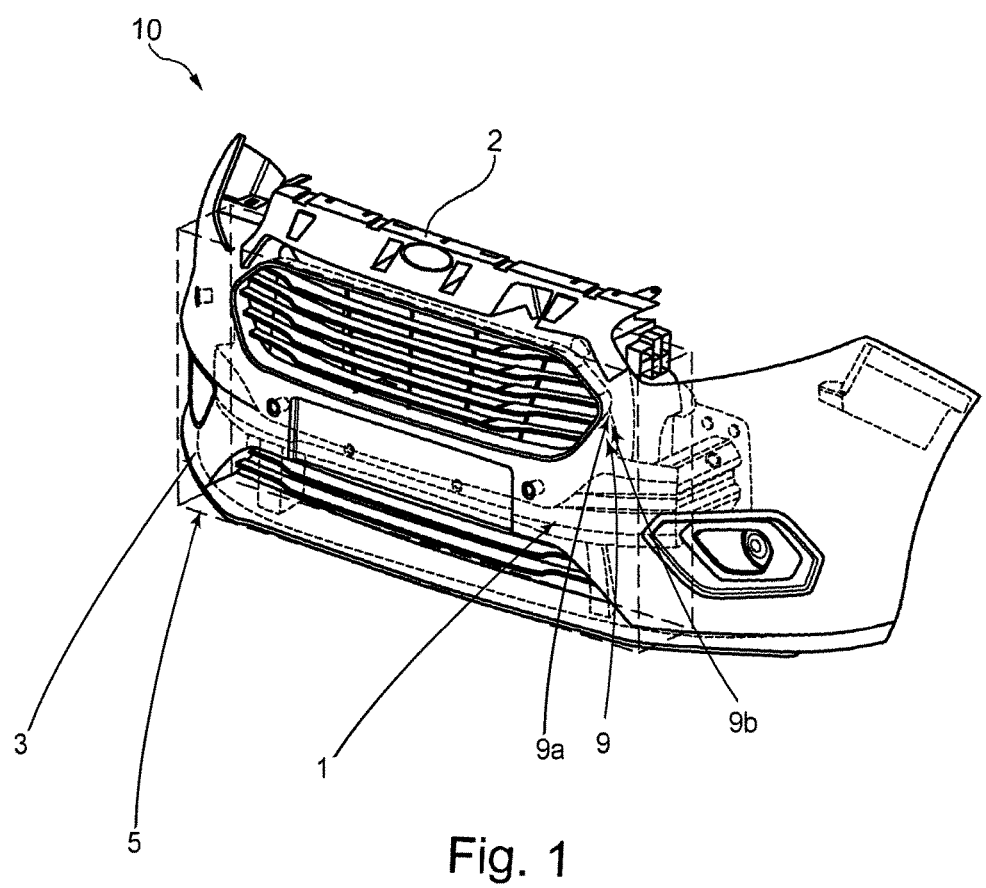
FIG. 1 is a front perspective view of a front module of a vehicle having an impact energy absorber member, according to one embodiment.
Figure 2:
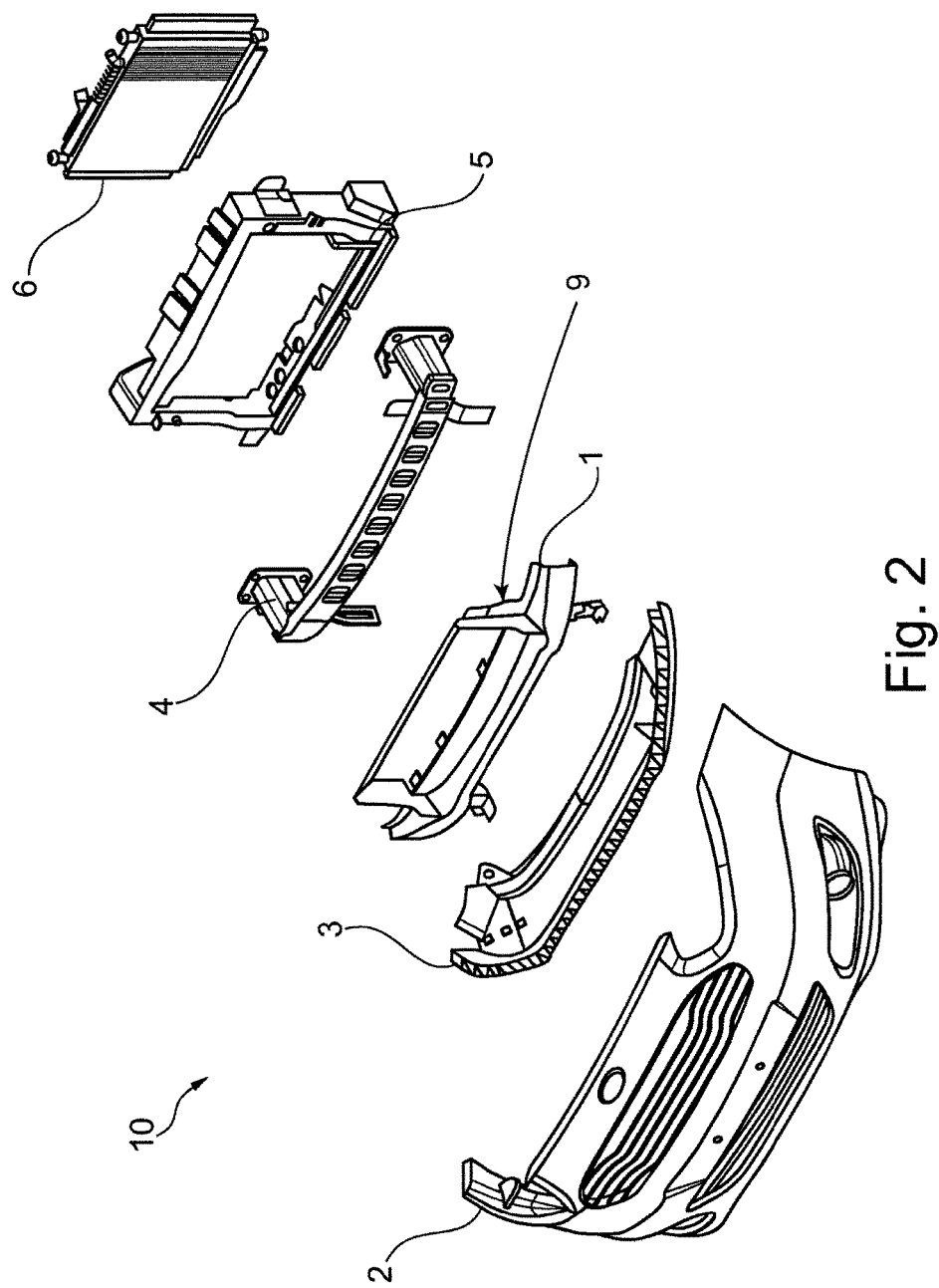
FIG. 2 is an exploded view of the front module shown in FIG. 1.

Referring now to FIGS. 1 and 2, the front module 10 for a vehicle is illustrated having an impact energy absorber member 1, a front bumper 2, a lower leg stiffener 3, a front bumper beam 4, a bolster frame 5, and a radiator 6. As shown in more detail in FIG. 2, in the direction of air flow on the front side is the front bumper 2, followed in the rearward direction by the lower leg stiffener 3, the impact energy absorber 1, the front bumper beam 4, the bolster frame 5, and the radiator 6.

The front module 10 of the vehicle advantageously includes an impact energy absorber member 1 configured to protect a lower leg of a pedestrian and that allows for reduced assembly process timing, reduced costs, and reduced weight. The impact energy absorber member 1 is configured to route air coming from the front bumper 2 received at the front of the vehicle rearward to the radiator 6 which is part of an engine cooling system of the vehicle.

Figure 3:
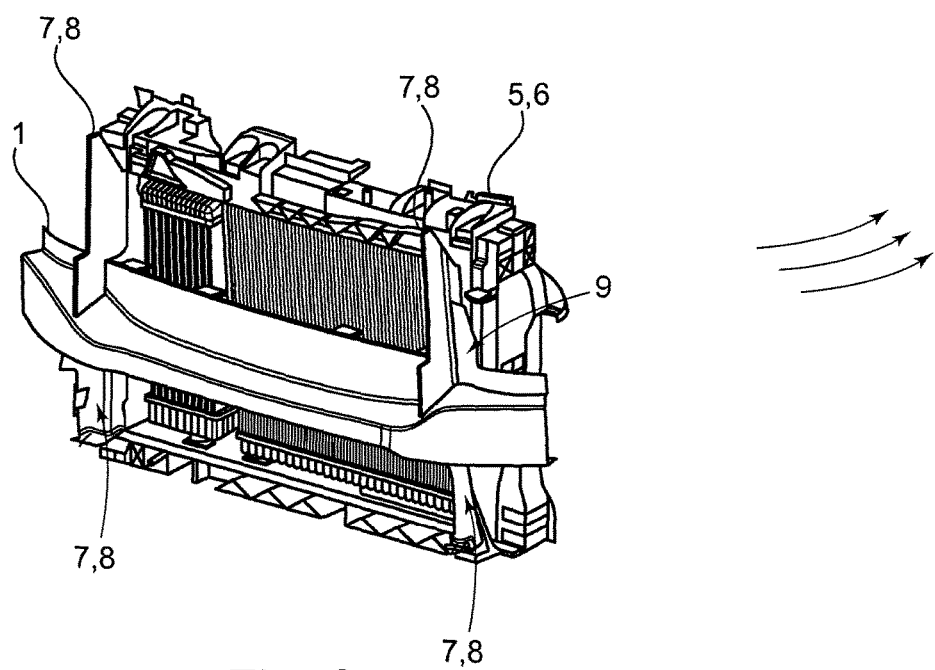
FIG. 3 is a front perspective view of an assembled part of the front module shown in FIG. 2.

Therefore, as shown in FIG. 3, the impact energy absorber member 1 comprises air guiding members 7 configured to ensure air flow and therefore effective cooling. In present example the air guide members 7 are four flaps 8 which are vertically orientated. It should be appreciated that one or more air guiding members 7 may be employed. The four flaps 8, and therefore the air guiding members 7, are integrated parts of the impact energy absorber member 1. Moreover, the impact energy absorber member 1 comprises a snap fit for fixing the impact energy absorber member 1 to the front bumper 2, according to one embodiment.

Figure 4:
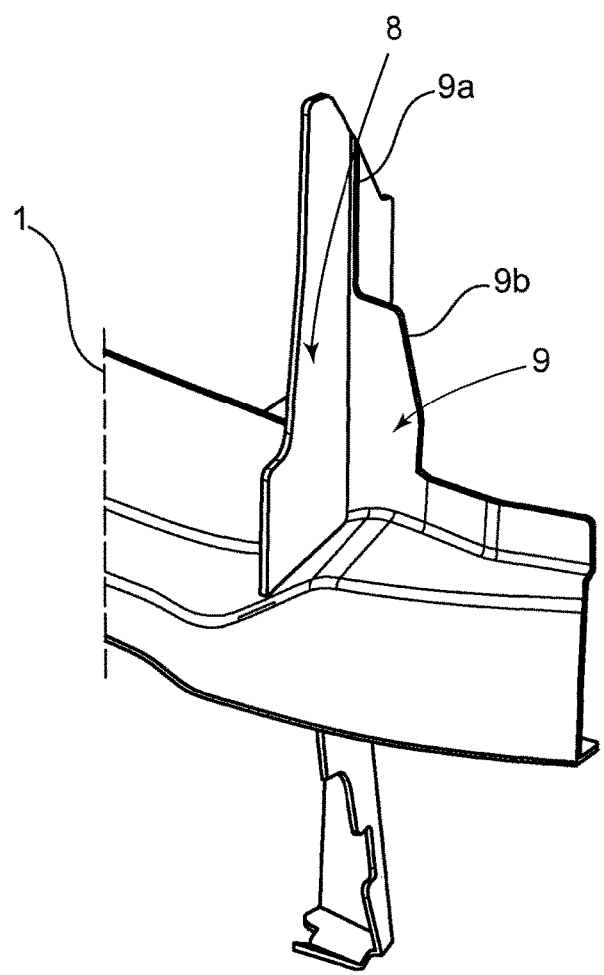
FIG. 4 is an enlarged view of a portion of the front module and reinforcement ribs shown in FIG. 1.

As shown in FIG. 4, at least one rib 9 may be coupled to the impact energy absorber member 1 and may reinforce the flap 8. The at least one rib 9 may include a first rib 9a and a second rib 9b. The first rib 9a may be fixed to the from bumper 2 when the from module 10 is assembled. The second rib 9b may be fixed to a holster frame 5 when the front module 10 is assembled. Accordingly, the impact energy absorber member 1 comprises at least one vertical flap 8 that is reinforced by at least one rib 9 that is fixed to a component of the front module 10, such as to the front bumper 2 and/or to the bolster frame 5 of the vehicle.

The lower leg stiffener 3 is configured to stiffen the pedestrian protection. The front bumper beam 4 comprises crash-cans according to one embodiment. The bolster frame 5 is configured to reinforce the front bumper 2 and the radiator 6.

The front module 10 and its parts, e.g., the impact energy absorber member 1 with the air guiding members 7, e.g., the flaps 8, the front bumper 2 with the first rib 9a fixed thereto when the front module is assembled, the lower leg stiffener 3, the front bumper beam 4, the bolster frame 5 with the second rib 9b fixed thereto when the front module is assembled can fabricated by plastic or metal injection moulding and therefore configured as integral parts, respectively.

Accordingly, the impact energy absorber member 1 and the front module 10 and the vehicle employing the impact energy absorber member 1 and front module 10 lead to reduced assembly process timing, costs, and weight.

The impact energy absorber member 1 for a vehicle according to one embodiment is configured to protect a lower leg of a pedestrian and comprises at least one integrated air guiding member for guiding air from a front bumper member of the vehicle to a radiator of the vehicle. The impact absorber member comprises at least one vertical flap, wherein the flap is reinforced by a rib that is fixed to the front bumper member and/or to a bolster frame of the vehicle. Accordingly, the impact energy absorber member 1 is arranged between the front bumper and the radiator which is located rearward in the direction of streaming air flow. In other words, a cooling air flow passed first the front bumper, then the impact energy absorber, and then the radiator. Thus, by the integrated guiding members air flow will be provided in one piece part instead of three different parts. Therefore, assembly and cost advantages will be gained. The at least one vertical flap ensure air flow and therefore effective cooling. Since the rib is fixed to the front bumper member and/or to the bolster frame the rib is part of the front bumper and/or of the bolster frame. The components are brought into contact during assembly of the front module. The rib can be an integrally part of the front bumper member and/or the bolster frame, for example, if the front bumper member and/or bolster frame is plastic or metal injection moulded.

In one embodiment, the impact energy absorber member 1 comprises a snap fit for fixing the impact energy absorber member to the front bumper member. This allows an easy assembly of the front module without using additional fixing means like screws, bolts, or the like.

In one embodiment, the bolster frame is arranged between the impact energy absorber member and the radiator. Accordingly, the bolster frame is arranged between the front bumper and the radiator in the direction of streaming air flow. In other words, a cooling air flow passed first the front bumper, then the bumper, and then the radiator.

Further, the impact energy absorption member may be assembled to a front module the front module and may be assembled onto a vehicle.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. An impact energy absorber member for a vehicle comprising:
   a body extending between outermost vehicle-lateral portions;
   at least one vertical flap for guiding air from a front bumper to a radiator of the vehicle, wherein the at least one vertical flap is positioned wholly between the outermost vehicle-lateral portions; and
   a rib integrally coupled to and reinforcing the at least one vertical flap and fixed to the front bumper.

2. The impact energy absorber member according to claim 1, wherein the impact energy absorber member is assembled onto the vehicle.

3. A front module for a vehicle comprising:
   a front bumper;
   a radiator;
   an impact energy absorber member;
   a vertical flap for guiding air from the front bumper to the radiator of the vehicle integrally formed with the impact energy absorber member and positioned wholly between the outermost vehicle-lateral portions of the impact energy absorber; and
   a rib reinforcing the at least one vertical flap and fixed to a bolster frame of the front module.

4. The front module for a vehicle according to claim 3, wherein the bolster frame is arranged between the impact energy absorber member and the radiator.

5. The front module for a vehicle according to claim 3, wherein the air guiding member comprises a plurality of air guiding members.

6. The front module for a vehicle according to claim 3, wherein the front module is assembled onto the vehicle.

* * * * *